April 7, 1942.  E. A. HOOPES  2,279,236
THERMOSTATIC ELEMENT
Original Filed Sept. 14, 1936
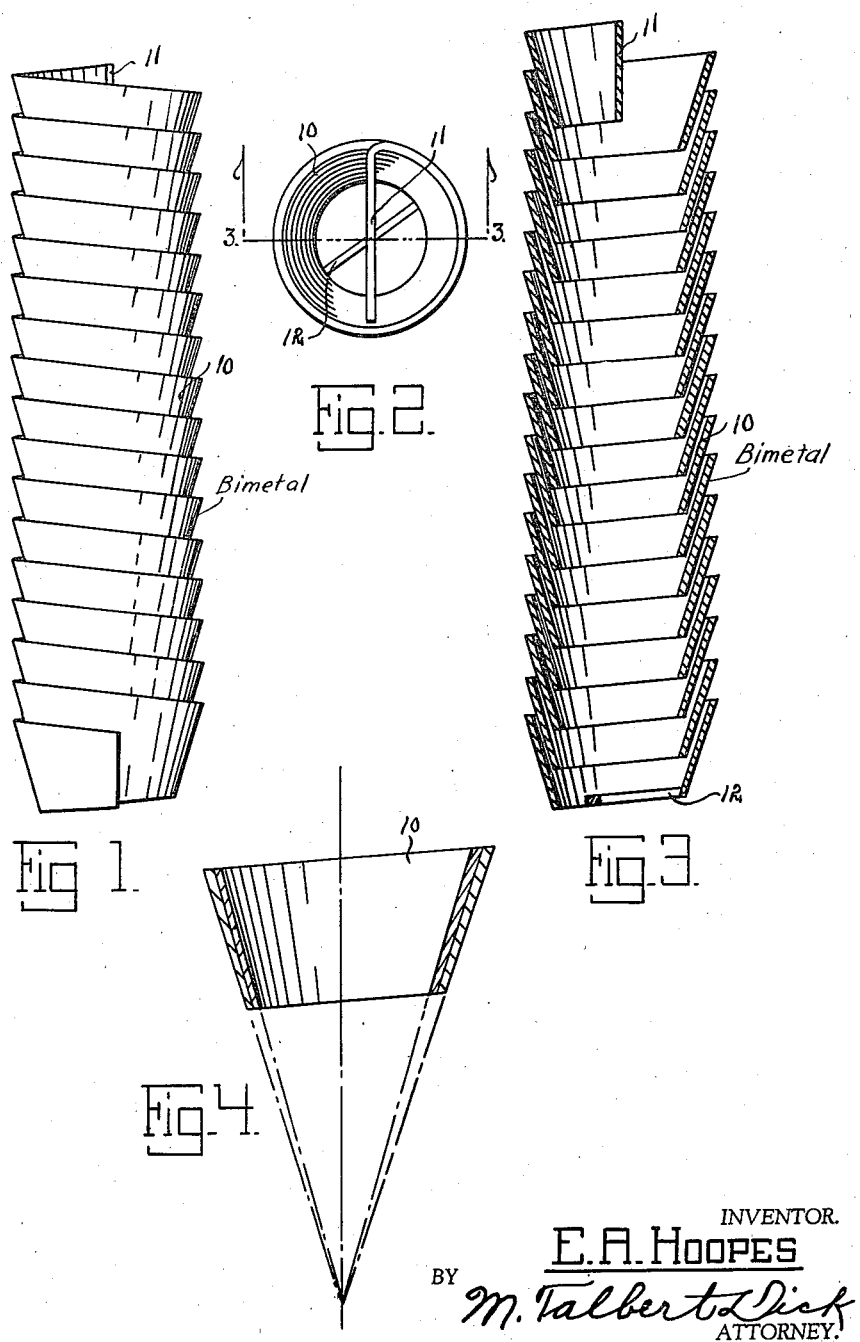
INVENTOR.
E. A. Hoopes
BY M. Talbert Dick
ATTORNEY.

Patented Apr. 7, 1942

2,279,236

UNITED STATES PATENT OFFICE 2,279,236

THERMOSTATIC ELEMENT

Ernest A. Hoopes, Des Moines, Iowa, assignor, by direct and mesne assignments, of three-eighths to Arthur W. Erskine, Cedar Rapids, and one-eighth to Frank D. Clark, Des Moines, Iowa Original application September 14, 1936, Serial No. 100,667. Divided and this application October 31, 1938, Serial No. 237,959

2 Claims. (Cl. 297—16)

This invention was originally disclosed in and is a division of my application for United States Letters Patent on a thermostatically controlled water mixer, filed in United States Patent Office on September 14, 1936, Serial No. 100,667, now Patent No. 2,145,115 dated Jan. 24, 1939.

The principal object of this invention is to provide a thermostatic element that is extremely sensitive to temperature variations and is rapid and uniform in its action.

A still further object of my invention is to provide a thermostatic element that is compact, positive in its action and does not buckle or become distorted in operation.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side view of my thermostatic element.

Fig. 2 is an end view of my thermostatic element.

Fig. 3 is a side sectional view of my thermostatic element taken on line 3—3 of Fig. 2 and more fully illustrates its construction.

Fig. 4 is an enlarged side sectional view of one of the winds of my device and illustrates the varying thickness of the ribbon as it progresses in one direction.

The thermostatic elements now in general use are usually bulky, not sufficiently sensitive, and are in most instances of the helically or spirally wound types.

My thermostatic element is generally designated by the numeral 10 and is constructed of a bi-metallic ribbon that is helically wound so that each succeeding turn or wind of the ribbon overlaps the one preceding it, thereby allowing each preceding turn to nest within the successive turns of each complete turn of the ribbon, as the same is of generally conical shape as shown in Fig. 3 of the drawing. By this construction, as shown in the drawing and as herein described, a thermostatic element is possible that allows for a greater length of thermostatic material or metal to be condensed in the smallest possible space. This means that a thermostatic element is provided that requires very little room but is highly sensitive and of strong action. Furthermore, by this construction more fluid, be it liquid or gas, is permitted to contact the surface of the thermostatic element in a minimum amount of space surrounding the element, thereby giving more accurate action when changes in temperature are experienced. It will further be noted that although each of the winds of the thermostatic element are nested within each other, they are spaced apart from each other as shown in Fig. 3, thereby permitting the fluid to engage both the inner and outer sides of each of the winds of the thermostatic ribbon thereby contacting the surfaces of both of the metals used in the bi-metallic ribbon. Also the fluid may pass freely through the sides and the ends of the thermostatic element.

My thermostatic element may be successfully used where it is desired to have a strong positive compact and sensitive element. In my co-pending application on a thermostatically controlled water mixer, filed September 14, 1936, Serial No. 100,667, I show this element used in connection with hot and cold water mixers. Although it may be used for many other purposes, it is particularly adapted for use with hot and cold water mixers as it permits the hot and cold water to directly contact a maximum amount of bi-metallic thermostatic metallic ribbon element in a given compact housing space. Obviously, one end of the element is secured to the valve mechanism of the hot and cold water mixer and the other end is secured to a manually adjustable lever or else fixed against movement. In order to secure the two ends of my thermostatic element to either fixed or movable members, I have bent the end portion of the upper ribbon wind across the longitudinal center line of the element as shown in Fig. 2 and which I have designated by the numeral 11 and secured to the other end of the element I have provided a bar member 12. Obviously either the portion 11 or member 12 is secured to the member to be operated by the thermostatic element and the remaining end or portion 11 or member 12, as the case may be, is secured to a fixed member or a manually controlled element for manually adjusting the thermostatic element to give the desired result. Obviously, either end of the thermostatic element may be secured by the use of either the portion 11 or member 12 to the member, to be actuated by the action of the thermostatic element. As shown in Fig. 3, the ribbon is spirally wound with each successive wind over-lapping the wind preceding it in order to produce an enlarged thermostatic element such as that shown in Fig. 1, By this construction, each wind will be of less diameter at its lower edge than its diameter at its upper edge as shown in Fig. 4. This makes possible the over-lapping of the spiral winds and the production of an elongated compact spiral thermostatic element without the over-lapping portions of the ribbon touching each other. Fig. 3 illustrates this construction wherein the upper portion of each succeeding spiral wrap is spaced apart but over-laps the lower portion of the previous spiral wrap. As the ribbon that makes up the thermostatic element is thusly wound, its upper or rear marginal edge on each wrap will be to the outside of the element while the forward or lower marginal edge of each spiral wrap will be at the inside of the elongated thermostatic element. Obviously, the rear marginal portion of all of the spiral wraps combined will be much longer than the combined forward marginal portions of the spiral wraps. If no provision were made for this fact, the upper portions of the spiral wraps would have a different coefficient of contraction and expansion than the inner and forward marginal portions of the spiral wraps and the element would have a tendency to bow or become distorted in operation. In order to overcome this difference of contraction and expansion, the ribbon that makes up the thermostatic column has its thickness tapering toward one of its side marginal edges before being wound into an element as shown in figure. By this construction and by the proper winding of the ribbon, the upper portion of each of the spiral winds will have a thickness greater than the thickness of the lower portion of that spiral wind as shown in Fig. 4. As noted in this Fig. 4, the inside plane and the outside plane of each spiral wrap coincide with each other at a common center point which is on a line of the center longitudinal axis of the finished thermostatic element. By this construction, the element will uniformally contract and expand throughout its entire area and there will be no tendency of the element to bind or become distorted in operation.

By the specific construction of my thermostat element, it is possible to provide an element that will successfully operate throughout the temperature changes without the tendency to increase its longitudinal length. Obviously this is very desirable for if a thermostatic element of the elongated type were to be rotatably secured at its ends and had a material tendency to increase its longitudinal length in action, a highly undesirable binding action on certain bearings would be experienced and even buckling or distortion of the element itself might take place.

From the foregoing it will readily be seen that I have provided a highly desirable thermostatic element constructed from a flat ribbon of thermal-sensitive bi-metallic material, helically wound in successive over-lapping conical spiral winds.

Some changes may be made in the construction and arrangement of my improved thermostatic element without departing from the real spirit and purpose of my invention and it is my intention to cover by my claims any modified forms of structure or use of mechanical equivalents which may be reasonably included within their scope.

I claim:

1. In a thermostatic element, a bi-metallic thermal-sensitive ribbon, helically wound in successive spaced apart over-lapping spiral winds, with each spiral wind having substantially the same diameter as the diameters of the other spiral winds.

2. In a thermostatic element, a thermal-sensitive bi-metallic member helically wound in successive over-lapping conical spiral winds with the thickness of the inner portion of each spiral wind less than the thickness of the outer portion of the spiral wind of which it is a part.

ERNEST A. HOOPES.